(No Model.)
J. F. MUNSIE.
CONDUIT SYSTEM FOR ELECTRIC CONDUCTORS.
No. 356,152. Patented Jan. 18, 1887.
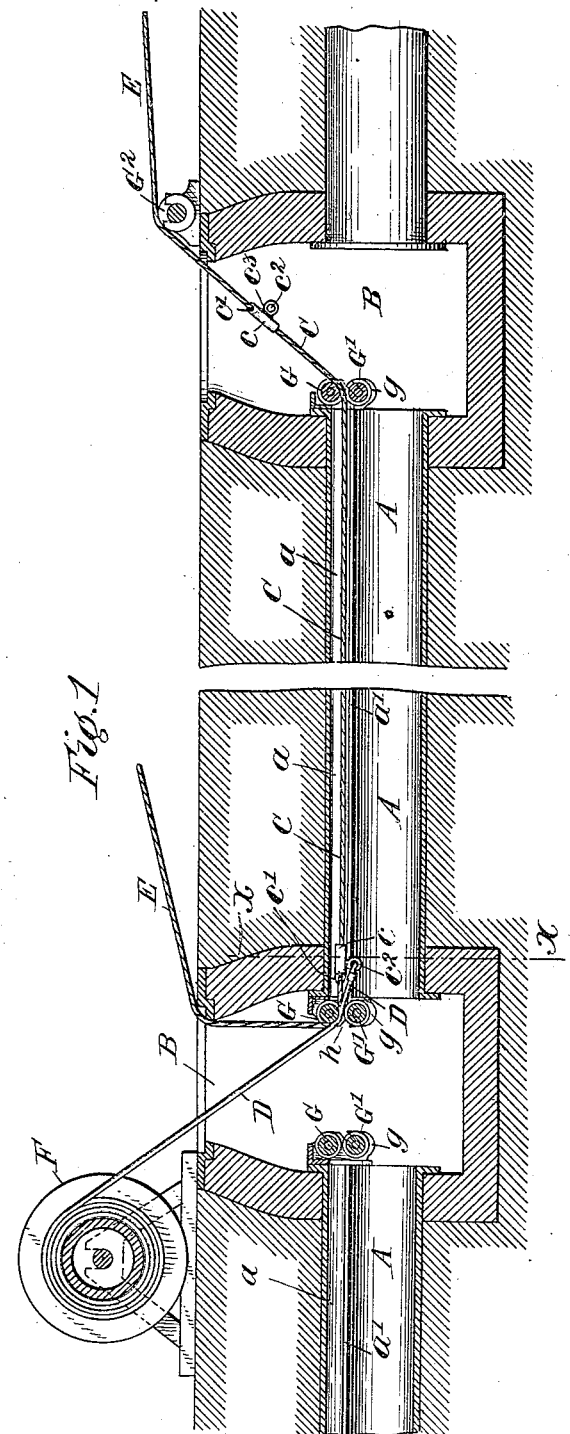
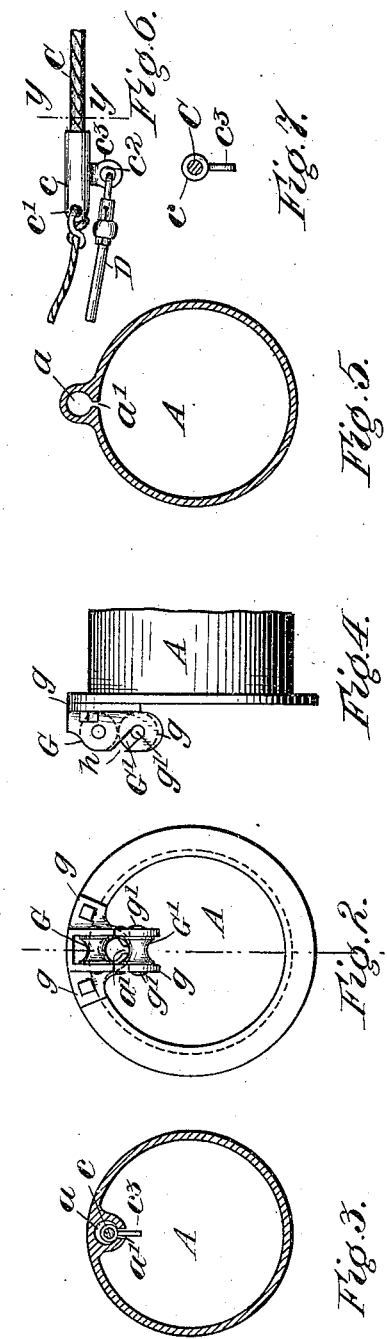
Witnesses:
Sam'l B. Dover.
Arthur Holliday.
Inventor:
James F. Munsie.
Geo. W. Le Vin.
Att'y

UNITED STATES PATENT OFFICE.

JAMES F. MUNSIE, OF CHICAGO, ILLINOIS.

CONDUIT SYSTEM FOR ELECTRIC CONDUCTORS.

SPECIFICATION forming part of Letters Patent No. 356,152, dated January 18, 1887.

Application filed September 17, 1886. Serial No. 213,790. (No model.)

*To all whom it may concern:*

Be it known that I, JAMES F. MUNSIE, a British subject, residing at Chicago, in the county of Cook and State of Illinois, have invented certain new and useful Improvements in Conduit Systems of Electric Conductors, of which the following is a full, clear, and exact description, reference being had to the accompanying drawings, and to the letters of reference marked thereon, which form part of this specification.

My invention relates especially to the work of hauling electric wires or cables through the conduit system; and, having for its object to provide means which permanently form part of the system for facilitating such work, it consists in the matters hereinafter set forth, and pointed out in the appended claims.

In the accompanying drawings, Figure 1 is a longitudinal section of part of a conduit system, taken vertically through the center of the conduit and man-holes, wells, or stations, said view substantially illustrating my present invention and the manner of its operation. Fig. 2 is an end view of the construction shown in said Fig. 1, with the hauling-cable, draw-rope, and electric wire or cable removed, said view being taken from the direction of one of the man-holes, wells, or stations. Fig. 3 is a transverse section of the construction shown in Figs. 1 and 2, taken on the line X X of said Fig. 1. Fig. 4 is a side detail of the conduit referred to in said described figures, said detail being particularly intended to illustrate the substantial arrangement and operation of the cable sustaining and guiding mechanism which I preferably employ at the terminals of the conduit within the man-holes, wells, or stations. Fig. 5 is a transverse sectional view showing a modification of the construction of conduit embodying my said invention shown in the several figures described. Figs. 6 and 7 are details showing the construction and manner of operation of the device which I preferably employ at each end of the hauling-cable.

To more fully describe my said invention, the conduit A is provided with a longitudinal duct or chamber, $a$, formed within or without its main portion, as particularly shown in the sectional views, Figs. 3 and 5, the said duct or chamber having a continuous longitudinal opening or passage, $a'$, which enters into the conduit, and being permanently provided with a hauling-cable, C, which, for the convenience of handling, may be of a length somewhat in excess of the length of the conduit between adjacent man-holes, wells, or stations, B, which are located at convenient distances throughout the system.

To each end of the hauling-cable C, I preferably attach a ferrule, $c$, which is provided with suitable eyes, $c'$ $c^2$, (or equivalent engaging points,) to which are respectively connected—to wit, to the eyes $c'$ draw-ropes E E, and to the eye $c^2$ of one of the ferrules, as occasion may require, the electric wire or cable, D, to be hauled through the conduit, the eye $c'$ being formed in the outer end of each ferrule, and the eye $c^2$ being formed in or near the outer or lower end of an arm, $c^3$, which projects downwardly therefrom, and which, extending through the opening or passage $a'$ of the duct or chamber into the main portion of the conduit, is intended to operate as a guide to prevent the hauling-cable C from twisting as it moves through said duct or chamber.

When not in actual operation, the hauling-cable C is located within the duct or chamber $a$ so that its ends (shown as having the ferrules $c$ attached thereto) project beyond the respective terminations of said duct or chamber into the man-holes, wells, or stations B, being allowed to depend therein, or being suitably hooked or otherwise fixedly held, as may be preferred.

To operate the hauling-cable, a draw-rope, E, being primarily attached thereto at each end, as substantially shown in Fig. 1, the electric wire or cable D (illustrated as being held upon a drum, F, located, for paying-out purposes, contiguous to one of the man-holes, wells, or stations B) is connected to one end thereof. A sufficient pulling force being then applied to the opposite end of said hauling-cable by means of the draw-rope E, connected thereto, which may be operated over a drum or roller, $G^2$, located upon the street-level, as shown in Fig. 1, the wire or cable D is readily drawn through the conduit. As the electric wire or cable is drawn through the conduit, the draw-rope E, which enters through the same man-hole, well, or station, follows the hauling-cable C, to which it is connected, through the duct or chamber *a* to its termination within the opposite man-hole, well, or station at which point the electric wire or cable is disconnected from said hauling-cable for connection with another hauling-cable, (if it should be necessary to extend the same farther through the system,) or for such other purposes as may be desired. The said following draw-rope E is then employed for pulling the hauling-cable C back to its original position.

It is obvious that the hauling-cable may be operated for drawing wires or cables into the conduit from either direction, as may be necessary.

It may be noted that the construction of the duct or chamber *a* with reference to its opening or passage *a'* is intended to be such that the hauling-cable C cannot drop therethrough into the conduit when the weight of the electric wire or cable is applied thereto, or under any other circumstances.

It will also be observed that by sustaining the electric wire or cable in the upper part of the conduit as it is being drawn therethrough, the frictional strain which would be present if the same were drawn upon the floor of the conduit or over wires or cables already laid therein is materially overcome; also, that by thus avoiding contact of the hauling-cable and electric wire or cable with wires or cables already laid, the possibilities of displacement or entanglement of or other damage to the latter is entirely overcome.

In order to lessen such friction as is necessarily incident to the operation of the hauling-cable C and the draw-rope E at their respective points of entering and passing from the duct or chamber *a*, and to sustain the electric wire or cable D as it is fed into the conduit, I preferably employ, at each end of the duct or chamber, grooved rollers G G', the office of which is fully shown in Fig. 1, in which the draw-rope and electric wire or cable are seen passing between the same.

To enable the hauling-cable C to be readily and properly entered into the duct or chamber *a* after the draw-rope and electric wire or cable have been connected thereto by means of the ferrule *c*, or otherwise, it is desirable to have one of the rollers removably located in its working position. To this end the roller-bracket *g* is provided with a slot or slots, *h*, in the bottom of which journals the spindle *g'* of the lower roller, G'. The upper end of said slot or slots being open, the manner of removing said roller from its operative location, as occasion may require, is manifest without further explanation.

Having thus fully described my invention, what I claim as new, and desire to secure by Letters Patent, is—

1. In a conduit system for electric conductors, the combination, with the conduit A, of a hauling-cable located in its upper portion and a support at the conduit end, for maintaining the conductor at the upper portion of the conduit during the hauling operation, substantially as and for the purposes set forth.

2. In a conduit system for electric conductors, the combination, with the conduit A, having the longitudinal chamber *a*, provided with a continuous longitudinal slot, of a hauling-cable located within the chamber *a*, and provided at its ends with ferrules having eyes for attaching a following rope and downward projections for attaching the electric conductor, substantially as and for the purposes set forth.

3. In a conduit system for electric conductors, the combination, with the conduit A, having the longitudinal chamber *a*, provided with a continuous longitudinal slot, of a hauling-cable located within the chamber *a*, and provided at its opposite ends with ferrules, the friction-rollers G, and removable rollers G', substantially as and for the purposes set forth.

JAMES F. MUNSIE.

Witnesses:
 GEO. W. LEVIN,
 FANNIE A. CASE.